Sept. 27, 1955  E. H. OTTO  2,718,855
BAKE OVEN FOR BAKING VARIOUS FOOD PRODUCTS
Filed Jan. 2, 1953
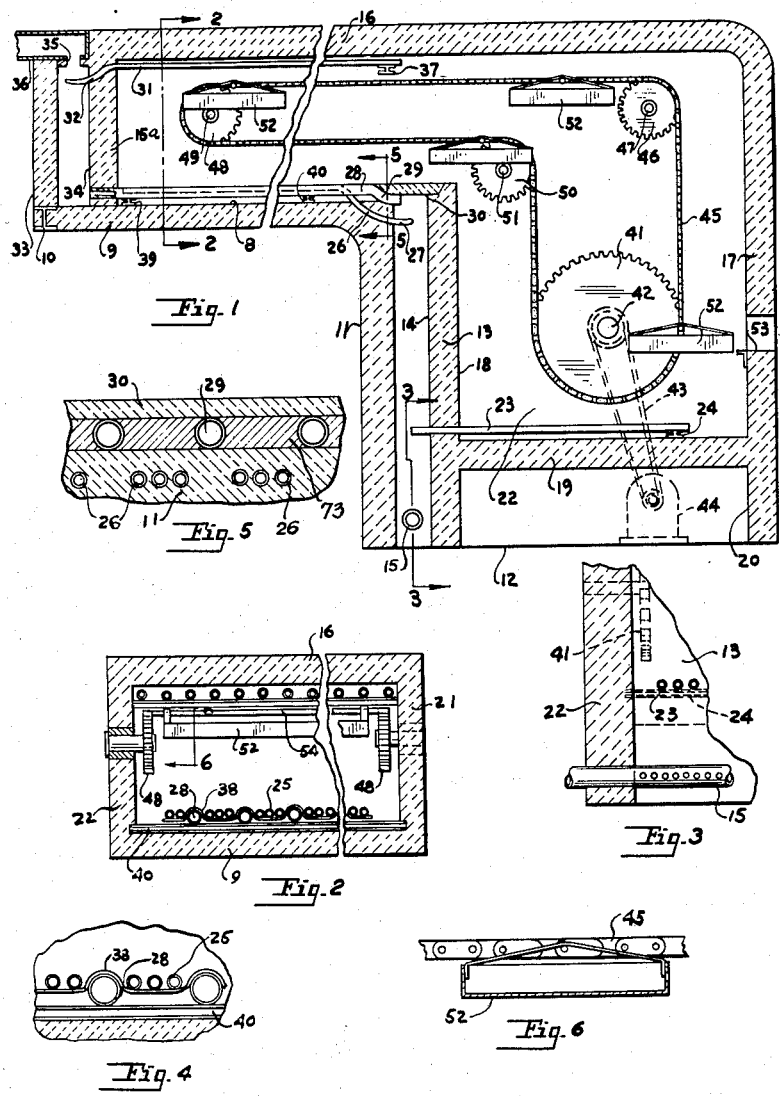
EDWARD H. OTTO
By Thos. L. Donnelly
ATTORNEY

United States Patent Office 2,718,855
Patented Sept. 27, 1955

2,718,855

BAKE OVEN FOR BAKING VARIOUS FOOD PRODUCTS

Edward H. Otto, Wayne County, Mich.

Application January 2, 1953, Serial No. 329,344

2 Claims. (Cl. 107—57)

My invention relates to bake ovens for baking various products, such as pan bread, hearth bread, vienna rolls, cakes, etc., and has for its object a new and improved form and arrangement whereby the oven is so constructed and arranged that the baking chamber is overhead, increasing the bakeshop oven capacity without additional building expansion costs and occupying a minimum of space, thus permitting the room in which the oven is positioned to be utilized to a large extent for other purposes.

Another object of the invention is that with the baking chamber elevated, the baker can operate the oven from the bakeshop floor level without discomfort as he will not be exposed to direct baking chamber heat and also undue heating of the room is prevented.

Another object of my invention is to provide a new improved combustion chamber which allows for the proper combustion of fuel before entering the oven flue system and provides the oven with a steady continuous heat flow which experience has shown should be at the same rate as the heat absorption by the loaf in order to produce uniform baking results. This construction not only prevents hot spots and often burning out of the flues but will prolong the life of the entire oven itself.

Another object of the invention is the provision of a baking oven of this class so arranged and constructed that a uniform distribution of heat throughout the oven may be accomplished.

Another object of the invention is the provision of a baking oven of this class so arranged and constructed that a maximum efficiency in heating may be obtained.

Another object of my invention is to construct a bake oven that is an overhead traveling oven, that may be easily fired with gas or oil from the bakeshop floor level and adaptable to coal or coke firing in localities where gas or oil as fuel is limited. Experience has shown that with a bake oven constructed in this manner a maximum of efficiency in baking operations is obtained. By having the products to be baked travel in this manner, the baking of the products the proper length of time at a maintained temperature becomes possible.

Another object of the invention is the provision of an oven so constructed and arranged that pans containing the goods to be baked may be loaded with the goods while on a conveyor chain and caused to travel through the oven and outwardly into a receiving chamber at which the baked products are removed.

Other objects will appear hereinafter.

It is recognized that various modifications and changes may be made in the detail of structure illustrated without departing from the invention and it is intended that such shall be embraced within the scope of the claims which forms a part hereof.

Forming a part of this specification is a drawing in which,

Fig. 1 is a central, vertical, sectional view of the invention,

Fig. 2 is a sectional view taken on line 2—2 of Fig. 1 with a part broken away and a part shown in section, Fig. 3 is a fragmentary sectional view taken on line 3—3 of Fig. 1, Fig. 4 is an enlarged fragmentary sectional view, Fig. 5 is a fragmentary sectional view taken on line 5—5 of Fig. 1, Fig. 6 is a fragmentary sectional view taken on line 6—6 of Fig. 2.

As shown in the drawing, the invention comprises a baking oven 8 having a bottom 9 supported by the I-beam 10 and the supporting wall 11 in elevated relation to the floor 12, wall 11 extending upwardly from the floor 12 in spaced relation to the wall 13 so as to provide combustion chamber 14 wherein a gas burner 15 is located. Extending upwardly from the bottom 9 is a bakewall 15$^a$, which serves to support one end of the top wall 16, which is supported at its other end by the front supporting wall 17. Thus there is a receiving compartment 18 at the forward end of the structure, this receiving compartment being in communication with the oven proper and in reality forming a part of the oven. A bottom 19 of the chamber 18 serves to connect the walls 13 and 17, this bottom 19 being elevated above the floor 12 to provide the space or compartment 20. Side walls 21 and 22 are also provided. Spaced in elevated relation to the bottom 19 within the chamber 18 by means of the I-beam 24 are water tubes 23, which project through the wall 13 and terminate in the combustion chamber 14, these water tubes being closed at both ends and containing a quantity of water for heating purposes.

Positioned within the oven 8 are closed water tubes 25 having the downwardly angularly turned portions 26 projecting through the wall 11 to provide a terminal portion 27 which terminates in the combustion chamber 14. Gas conducting tubes 28 are projected at one end through the wall 15$^a$ and at their opposite ends these tubes 28 are provided with the downwardly angularly turned portion 29 which terminates in communication with the combustion chamber 14 to conduct the gases from the combustion chamber 14 to the chamber 34 which is between the walls 15$^a$ and 33.

A tile 30 serves to close the upper end of the combustion chamber 14. Beneath the tile 30 and at opposite sides of the terminal portions 29 may be deposited a layer 73 of suitable material such as concrete or other insulating matter. Positioned in the oven 8 in spaced relation to the inner surface of the top 16 are water tubes 31 which are supported at one end by the I-beam 37 and the opposite ends are angularly turned as at 32 and projected downwardly through the wall 15$^a$ to terminate in the chamber 34. This chamber 34 is in communication through the constricted passage 35 with the outlet flue 36.

The construction is such that the gas burner 15 will serve as a means for heating the combustion chamber 14 and the hot gases passing upwardly will heat the water in the tubes 23 and 25 and then pass through the conducting tubes 28 into the chamber 34. The hot gases in the chamber 34 are retarded in their flow because of the constricted passage 35 and these hot gases in the chamber 34 will serve to heat the water in the tubes 31. With this arrangement an even and sustained temperature may be obtained in the oven compartments 8 and 18 with the heat properly distributed for efficiency in baking.

The tubes 25 are held in elevated relation to the inner surface of the bottom 9 by means of the strap 38 which overlies the tubes 28, these tubes 28 being held in elevated relation by the I-beams 39 and 40.

Sprocket gears 41 are mounted at opposite sides of the compartment 18 on the stub shaft 42, one of these sprockets 41 being driven by sprocket chain 43 which is driven by a motor 44. The sprocket chains 45, which pass over the sprockets 41, also pass over the sprockets 46 journaled on the shafts 47. These sprocket chains 45 are endless and also pass around the sprocket wheels 48 journaled on the shafts 49 and the sprocket wheels 50 journaled on the shafts 51. The sprocket chains at opposite sides are connected by the rods 54, from each of which is suspended a baking pan 52. These baking pans 52 are caused to traverse the length of the oven compartment 8 and the compartment 18. The construction is such that as the baking pans 52 pass the opening 53 in the wall 17 the baked goods may be removed and additional unbaked dough placed in the pan. This facilitates the baking of the goods and renders them easily accessible.

What I claim is:

1. In an oven of the class described, a combustion chamber adapted for resting on a supporting surface and projecting upwardly therefrom; a baking chamber, one end of said baking chamber being supported on the upper end of said combustion chamber in elevated position relative to said supporting surface; water containing tubes in said baking chamber and one end thereof extending into said combustion chamber; tubes for conducting hot gases from said combustion chamber longitudinally of said baking chamber; a compartment located forwardly of said baking chamber and extending from proximity to said supporting surface upwardly to the upper side of said baking chamber and having at a point below said baking chamber an opening formed in its forward wall; a conveyor traversing said baking chamber and passing said opening whereby the goods to be baked may be delivered to the pans through said opening and removed therefrom; and a plurality of baking pans mounted on said conveyor in spaced relation; a compartment at the rear of said baking chamber for receiving gases conducted from said combustion chamber; and a plurality of water containing tubes extending longitudinally of said baking chamber adjacent the upper side thereof and having one end thereof extended into said gas receiving compartment; and an outlet flue communicating with said gas receiving compartment through a constricted passage.

2. In an oven of the class described, a combustion chamber resting on a supporting surface and projecting upwardly therefrom; a baking chamber, one end of said baking chamber being supported on the upper end of said combustion chamber in elevated relation to said supporting surface; closed water containing tubes in said baking chamber and one end thereof extending into said combustion chamber for transmitting heat from said combustion chamber into said baking chamber; tubes for conducting hot gases from said combustion chamber through said baking chamber longitudinally thereof; a compartment at the rear of said baking chamber for receiving gases conducted from said combustion chamber through said tubes; a compartment located forwardly of said baking chamber and extending from proximity to said supporting surface upwardly to the upper side of said baking chamber and communicating therewith and having at a point below said baking chamber an opening formed in its forward wall; a conveyor traversing said baking chamber and said opening; a plurality of baking pans mounted on said conveyor in spaced relation for passage past said opening whereby goods to be baked may be delivered to said pans and removed therefrom; a plurality of closed water containing tubes in said baking chamber and extending longitudinally thereof adjacent to the upper side thereof, each having one end extending into said gas receiving compartment, and an outlet for communicating with said gas receiving compartment through a constricted passage for conducting gases from said gas receiving compartment.

References Cited in the file of this patent

UNITED STATES PATENTS

| 1,999,503 | Houlis | Apr. 30, 1935 |
| 2,055,101 | Gottfried | Sept. 22, 1936 |
| 2,530,778 | Otto | Nov. 21, 1950 |

FOREIGN PATENTS

| 14,745 | Great Britain | July 11, 1908 |